(No Model.)

P. P. SMITH.
RAILWAY RAIL JOINT AND FASTENING.

No. 499,049. Patented June 6, 1893.

Witnesses.

Inventor:
Parker P. Smith.
By James L. Norris.
Atty.

United States Patent Office.

PARKER P. SMITH, OF JEANNETTE, PENNSYLVANIA.

RAILWAY-RAIL JOINT AND FASTENING.

SPECIFICATION forming part of Letters Patent No. 499,049, dated June 6, 1893.

Application filed March 9, 1893. Serial No. 465,653. (No model.)

*To all whom it may concern:*

Be it known that I, PARKER P. SMITH, a citizen of the United States, residing at Jeannette, in the county of Westmoreland and State of Pennsylvania, have invented new and useful improvements in Railway-Rail Joints and Fastenings; of which the following is a specification.

This invention has relation to improvements in fastenings for the meeting ends of railroad rails, and it consists in the novel construction and arrangement of parts, as will be hereinafter described and particularly pointed out in the claims.

Figure 1:
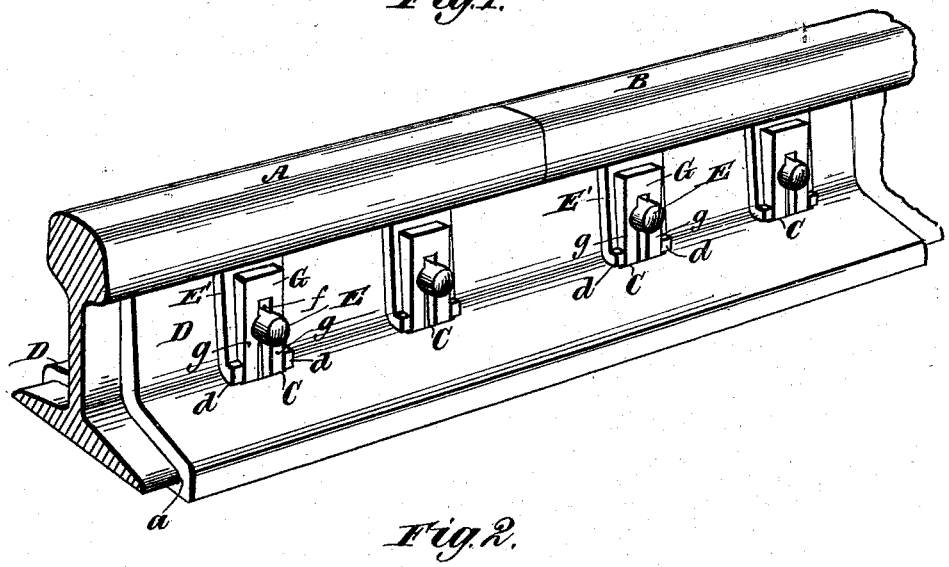
Figure 2:
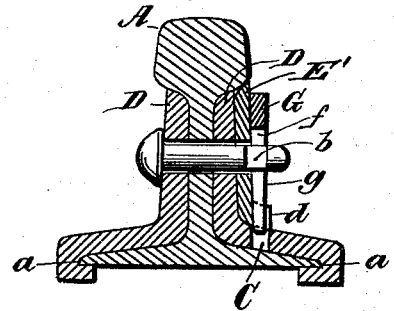
Figure 3:
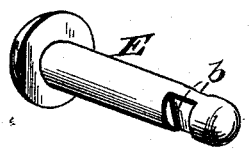
Figure 4:
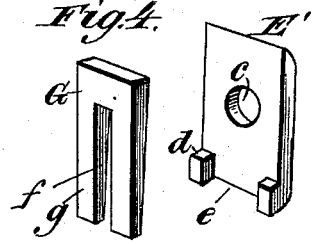

In the accompanying drawings,—Figure 1 is a perspective view of my improvement. Fig. 2 is a transverse vertical section thereof, and Figs. 3 and 4 are detail views of the bolt, locking plate, and key.

Referring to the drawings, the letters A and B designate the meeting ends of a railroad rail constructed in the ordinary manner, and having a series of openings in their body portions for the passage of bolts.

The letters D, D, indicate fish plates or pairs which are constructed as shown to inclose the opposite sides of the sections below the tread of the rails, their upper portions being beveled so as to abut against the under surfaces of the tread. The lower or outer extremities of the fish plates are provided with grooves or channels $a$, which are designed to pass over the outer edges of the rails to keep the rails in position.

C are elongated slots formed in the fish plates for a purpose presently to be mentioned.

The letter E designates bolts to engage the openings of the rails and corresponding openings in the fish plates. One end of these bolts is headed while their opposite ends are notched or cut-away as at $b$ for a purpose also to be presently explained.

E' are the locking plates having central openings $c$, which are designed to be passed over the notched ends of the bolts, the notches projecting outward some distance from the bodies of the locking plates. These plates are also provided with beveled upper edges which are arranged with respect to the tread of the rail similar to those of the fish plates. The lower face portions of these plates are provided with projections or lugs $d$, by means of which recesses $e$, are formed between them.

The letter G designates the keys of my improvement which are made preferably in wedge shape form as shown, and these keys consist of having their central portions slotted as shown at $f$, forming on opposite sides of the slots, legs $g$. The said slots are designed to be passed over the notched ends of the bolts and the keys forced downward until one portion of the ends thereof enters the recesses between the lugs, the extreme ends of the legs of the key-plates entering the slots of the fish plates whereby the keys are securely held in place, thus rendering the several parts of my improvement immovable.

Having described my invention, what I claim is—

1. The combination with the rails, and the fish plates; of a bolt having a notch at one end, a plate with lugs fitted on said bolt, a key with a central slot for engaging the notch of said bolt and lugs of said plate, substantially as and for the purpose specified.

2. The combination with the rails and fish plates with slots therein, said plates inclosing the bodies of the rails below their treads, and having channels for engaging the lower outer edges of said rails, of the bolts having notches at one end, a locking plate with lugs, and an opening for engaging the bolt, slotted keys with legs for engaging the notches of bolts, lugs of the plate, and slots of the fish plates, substantially as specified.

In testimony whereof I have hereunto set my hand and affixed my seal in presence of two subscribing witnesses.

PARKER P. SMITH. [L. S.]

Witnesses:
ROBT. COOK,
J. R. SPIEGEL.